United States Patent [19]
Church et al.

[11] Patent Number: 5,572,393
[45] Date of Patent: Nov. 5, 1996

[54] COMPLIANT GUIDE ASSEMBLY FOR A MAGNETIC TAPE TRANSPORT

[75] Inventors: Wayne E. Church, Longmont; Donovan M. Janssen, Boulder; Willis A. Straight, Arvada, all of Colo.

[73] Assignee: Storage Technology Corporation, Louisville, Colo.

[21] Appl. No.: 352,787

[22] Filed: Dec. 1, 1994

Related U.S. Application Data

[62] Division of Ser. No. 122,307, Sep. 17, 1993.
[51] Int. Cl.$^6$ ............................ G11B 15/60; B65H 20/14
[52] U.S. Cl. ................................. 360/130.21; 242/346.1
[58] Field of Search ............. 360/130.2, 130.21–130.24, 360/102; 226/198, 97, 7; 242/332.3, 346–346.1; 324/202

[56] References Cited

U.S. PATENT DOCUMENTS

| | | | |
|---|---|---|---|
| 3,850,358 | 11/1974 | Nettles | 226/198 |
| 3,912,144 | 10/1975 | Arseneault et al. | 360/102 |
| 4,520,555 | 6/1985 | Gyi et al. | 29/603 |
| 5,300,175 | 4/1994 | Gardner et al. | 156/285 |
| 5,310,107 | 5/1994 | Todd et al. | 226/196 |

OTHER PUBLICATIONS

Research Disclosure, "Crossbar Complaint Guide", Kenneth Mason Publications, No. 339, Jul. 1992.

*Primary Examiner*—Stuart S. Levy
*Assistant Examiner*—George J. Letscher
*Attorney, Agent, or Firm*—Sterne, Kessler, Goldstein & Fox P.L.L.C.

[57] ABSTRACT

A compliant guide assembly in a tape transport provides a precisely calibrated biasing force to an edge of a magnetic tape to precisely position tile tape with respect to a read/write head. The compliant guide assembly includes a plurality of guide buttons and a spring assembly having a plurality of cantilever spring elements. Each guide button includes an elongated stem and a head. The stem of each guide button is fixedly attached to a distal end of one of the cantilever spring elements such that the head of each guide button is disposed a calibrated distance from the distal end of the spring element. The biasing force is exerted on each spring element with a predetermined force. This force varies the distance between each spring element and its corresponding guide button and maintains these distances while each guide button is attached to its corresponding spring element.

5 Claims, 11 Drawing Sheets

COMPLIANT GUIDE ASSEMBLY FOR A MAGNETIC TAPE TRANSPORT

This application is a division of application Ser. No. 08/122,307, filed Sep. 127, 1993.

BACKGROUND OF THE INVENTION

1. Field of the Invention

The invention relates generally to the field of magnetic recording, and more particularly, to a compliant guide assembly for providing a biasing force to an edge of a tape to precisely position the tape as it passes a read/write head.

2. Related Art

Magnetic tape is used extensively in the computer and data processing industries for storing large quantities of data. Data is read from and written to a tape using a tape transport. The data is generally written to the tape in a longitudinal, multi-track format.

In order for a magnetic tape head to read data from and write data to a tape, it is important that the tape be precisely aligned with the head. This alignment assures that each track on the tape aligns with corresponding read and write gaps in the tape head.

Lateral alignment of the tape to the head has been conventionally performed by positioning a tape guide adjacent the head. The tape guide defines a reference surface perpendicular to the plane of the tape. By bringing an edge of the tape into precise contact with the tape guide, the position of the tape with respect to the head is assured. A compliant guide assembly is used to bias the opposite edge of the tape against the tape guide.

The conventional compliant guide assembly includes a spring assembly having a body with a plurality of cantilever spring elements extending outward therefrom. Each spring element has a ceramic guide button attached to its distal end. The spring assembly is photo etched from a sheet of stainless steel. The ceramic guide buttons are then bonded to each of the cantilever spring elements. The guide buttons contact the edge of the tape to urge the opposite edge of the tape against the tape guide.

Conventional compliant guide assemblies tend to provide varying and unpredictable biasing forces on the tape. If the applied biasing force is too great, it can cause the tape to buckle near the read/write head. This can cause data read errors. If the biasing force is too small, then the tape may lift from the tape guide, resulting in a loss of alignment between the read/write gaps and the data tracks on the tape.

A number of variables contribute to the unpredictability of the biasing force exerted by each cantilever spring element of the compliant guide assembly. These include variations in the thickness of the spring material, an initial offset of a spring element from a nominal position due to curvatures in the spring material, variations in the width of each cantilever spring element, variations in the length of each cantilever spring element, variations in the modulus of elasticity of the spring material, variations in the width of the tape, variations in the thickness of the guide button, and variations in the thickness of the adhesive commonly used to bond the guide button to the cantilever spring element.

The conventional compliant guide assembly is inexpensive to manufacture. However, the variance and unpredictability of the forces exerted by each cantilever spring element may be unacceptable for certain tape transport applications. For example, as track widths and track pitches become smaller in an attempt to increase areal densities (i.e., data per unit area), the need for precise tape/head positioning becomes increasingly important.

What is needed is a compliant guide assembly that exerts a more uniform biasing force to the edge of a tape.

SUMMARY OF THE INVENTION

The invention is a compliant guide assembly for a magnetic tape transport, including a method and fixture for manufacturing the same. The compliant guide assembly is configured to provide a precisely calibrated biasing force to an edge of a tape to precisely position the tape as it passes a read/write head in a tape transport.

The guide assembly includes a spring assembly formed from a sheet of resilient material (e.g., stainless steel) and a plurality of guide buttons. The spring assembly includes a body portion and a plurality of cantilever spring elements. Each cantilever spring element extends outward from the body portion. Each guide button includes an elongated stem and a head. The stem of each guide button is fixed to a distal end of each cantilever spring element. The head of each guide button is disposed a calibrated distance from the distal end of the spring element. The calibrated distance is determined by the distance that the spring element is displaced by application of a calibration force.

The calibrated distance between the head of each button and the distal end of each cantilever spring element is maintained by fixing each elongated stem of the guide button to the distal end of the spring. In the preferred embodiment, the distal end of each cantilever spring element includes a substantially circular opening. The opening is slightly larger than the diameter of the stem of each guide button. The stem of each guide button is inserted into the opening. Because the stem is elongated, the cantilever spring element may be moved along the elongated stem and fixedly attached at any point along the stem using an adhesive. This allows the calibrated distance to be uniquely fixed for each cantilever spring element.

Calibration of the compliant guide assembly is performed during attachment of the guide buttons to the spring assembly. Calibration involves fixing each guide button a calibrated distance from the distal end of each cantilever spring element. The calibrated distance is the distance that the spring element is displaced by application of a predetermined force to the spring element.

Calibration is performed using a compliant guide assembly fixture. The fixture includes a base means for receiving the spring assembly and the guide buttons and for aligning each guide button with one of the spring elements of the spring assembly. A bias means is then used to bias each spring element with a predetermined force to vary the distance between each spring element and its corresponding guide button. Each distance is maintained by application of the force while each guide button is fixedly attached to its corresponding spring element.

In the preferred embodiment, the bias means includes a plurality of pneumatic cylinders with a pneumatic piston disposed in each cylinder. The base means includes a pressure plate, a vacuum block, and a button template. The pressure plate defines a substantially flat first surface having a plurality of pressure ports to provide a pressurized fluid to each pneumatic cylinder. The plurality of cylinders of the bias means are disposed in the vacuum block.

The vacuum block defines second and third substantially flat opposed surfaces. The second surface is configured to couple with the first surface of the pressure plate so that each pressure port of the pressure plate aligns with a cylinder of the vacuum block. The vacuum block further includes a plurality of vacuum ports disposed in the third surface. Each vacuum port is positioned adjacent a corresponding pneumatic cylinder. The vacuum ports are configured to be coupled with a vacuum source.

The button template is mounted to the third surface of the vacuum block. The template includes a plurality of button cavities. Each button cavity is configured to align with a corresponding pneumatic cylinder and vacuum port. Each cavity is further configured to hold one of the plurality of guide buttons and to align the head of the guide button over a corresponding vacuum port.

The fixture further includes means for securing the spring assembly to the base means so that each cantilever spring element aligns with a corresponding button cavity and a corresponding piston. Means for coupling the vacuum block with a vacuum source creates a vacuum in each of the vacuum ports to securely seat a button in each button cavity. Means for receiving a pressurized fluid from a pressure source provides a pressurized fluid to each of the plurality of pneumatic cylinders. Each piston is aligned to contact a corresponding spring element when the pressurized fluid causes the pistons to extend up from the third surface of the vacuum block. Each piston provides a biasing force to a corresponding spring element.

The compliant guide assembly of the invention is calibrated/assembled using the fixture of the invention according to the following method. The guide buttons are loaded into the button cavities of the calibration fixture with the stems of the guide buttons oriented upward. The spring assembly is then secured to the fixture so that a distal end of each cantilever spring element is disposed proximate a corresponding guide button. The stem of each guide button will extend up through an opening in each spring element.

Next, a vacuum is applied to the vacuum ports to securely and squarely seat each button in its cavity. The pistons of the fixture then exert a calibrated biasing force on each cantilever spring element. The biasing force acts to maintain each cantilever spring element at a distance above the head of each corresponding guide button. While this distance is maintained by the pistons, the stem of each guide button is fixedly attached to the corresponding spring element. The calibrated biasing force on each cantilever spring element and the vacuum force on each button head are then released, and the compliant guide assembly is removed from the calibration fixture.

Of the variables which contribute to the unpredictability of the biasing forces of the cantilever spring elements of the prior art, many are eliminated by the invention. Calibration according to the invention eliminates force variations caused by variations in the thickness of the spring material, an initial offset of a spring element frown a nominal position due to curvatures in the spring material, variations in the width of each cantilever spring element, variations in the length of each cantilever spring element, variations in the modulus of elasticity of the spring material, variations in the thickness of the guide button, and variations in the thickness of the adhesive commonly used to bond the guide button to the cantilever spring element. The only variable not removed is variations in the width of the tape.

Thus, the invention enables precise edge biasing forces to be achieved in a direct and cost effective manner. The foregoing and other objects, features and advantages of the invention will be apparent from the following, more particular description of a preferred embodiment to the invention, as illustrated in the accompanying drawings.

DETAILED DESCRIPTION OF THE PREFERRED EMBODIMENTS

The preferred embodiment of the invention is discussed in detail below. While specific configurations and arrangements are discussed, it should be understood that this is done for illustration purposes only. A person skilled in the art will recognize that other configurations and arrangements may be used without departing from the spirit and scope of the invention.

The preferred embodiment of the invention is now described with reference to the figures where like reference numbers indicate like elements. Also in the figures, the left most digit of each reference number corresponds to the figure in which the reference number is first used.

Figure 1:
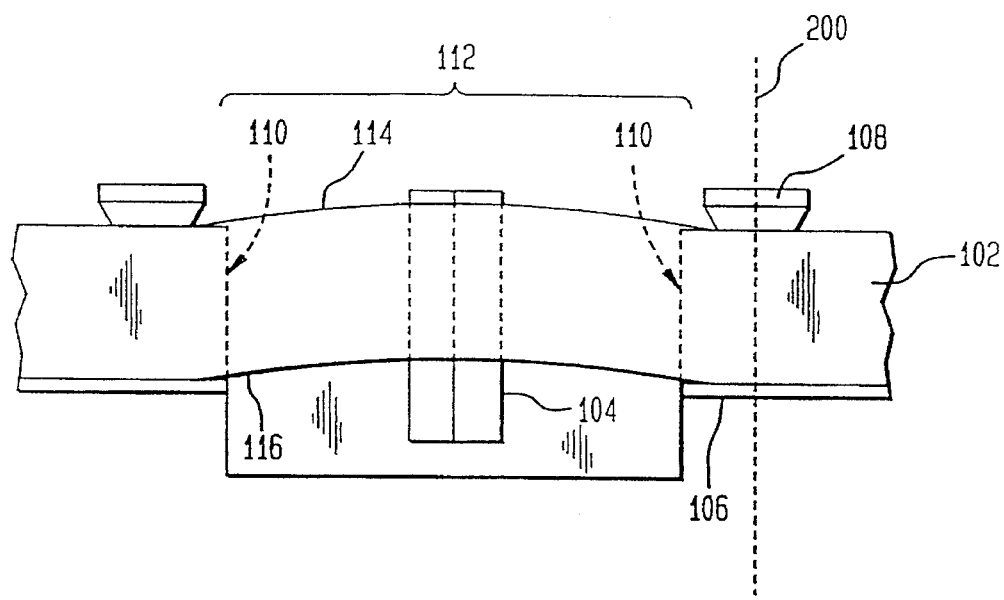
FIG. 1 is a front view of a head/air bearing assembly illustrating the relationship between a tape and the read/write head.

FIG. 1 illustrates the relationship between a magnetic recording tape 102 and a read/write head 104. An air bearing 110 aligns tape 102 with head 104. Air bearing 110 includes a gap 112 in which head 104 is disposed. The bottom portion of air bearing 110 includes a reference edge or tape guide 106. Compliant guide buttons 108 provide a biasing force to the upper edge 114 of tape 102 to maintain the lower edge 116 of tape 102 against tape guide 106. This assures proper positioning of tape 102 with respect to head 104.

As discussed above, it is important that the compliant guide 108 provide a precise biasing force to the upper edge of tape 102. If the biasing force is too large, then the force may cause tape 102 to buckle. A buckle in tape 102 near head 104 can cause read or write errors. If the force exerted by buttons 108 is too small, then the lower edge of tape 102 may lift away from tape guide 106. This can result in improper positioning between the data tracks on tape 102 and the read/write gaps of head 104.

Figure 2:
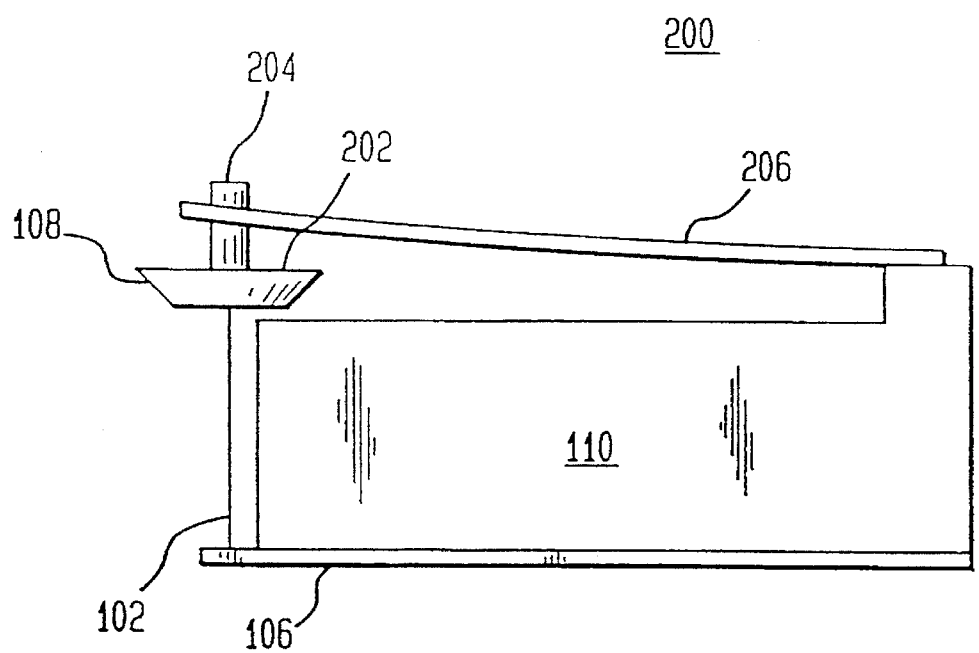
FIG. 2 is a cross sectional view taken along a line 200 of FIG. 1.

FIG. 2 shows a cross sectional view 200 of the relationship between air bearing 110, tape 102, reference guide 106, and button 108 of FIG. 1. This sectional view is taken along line 200 and perpendicular to the drawing sheet of FIG. 1. As illustrated in FIG. 2, guide button 108 includes a head portion 202 and a stem portion 204. Stem portion 204 is fixedly attached to a cantilever spring element 206.

Figure 3:
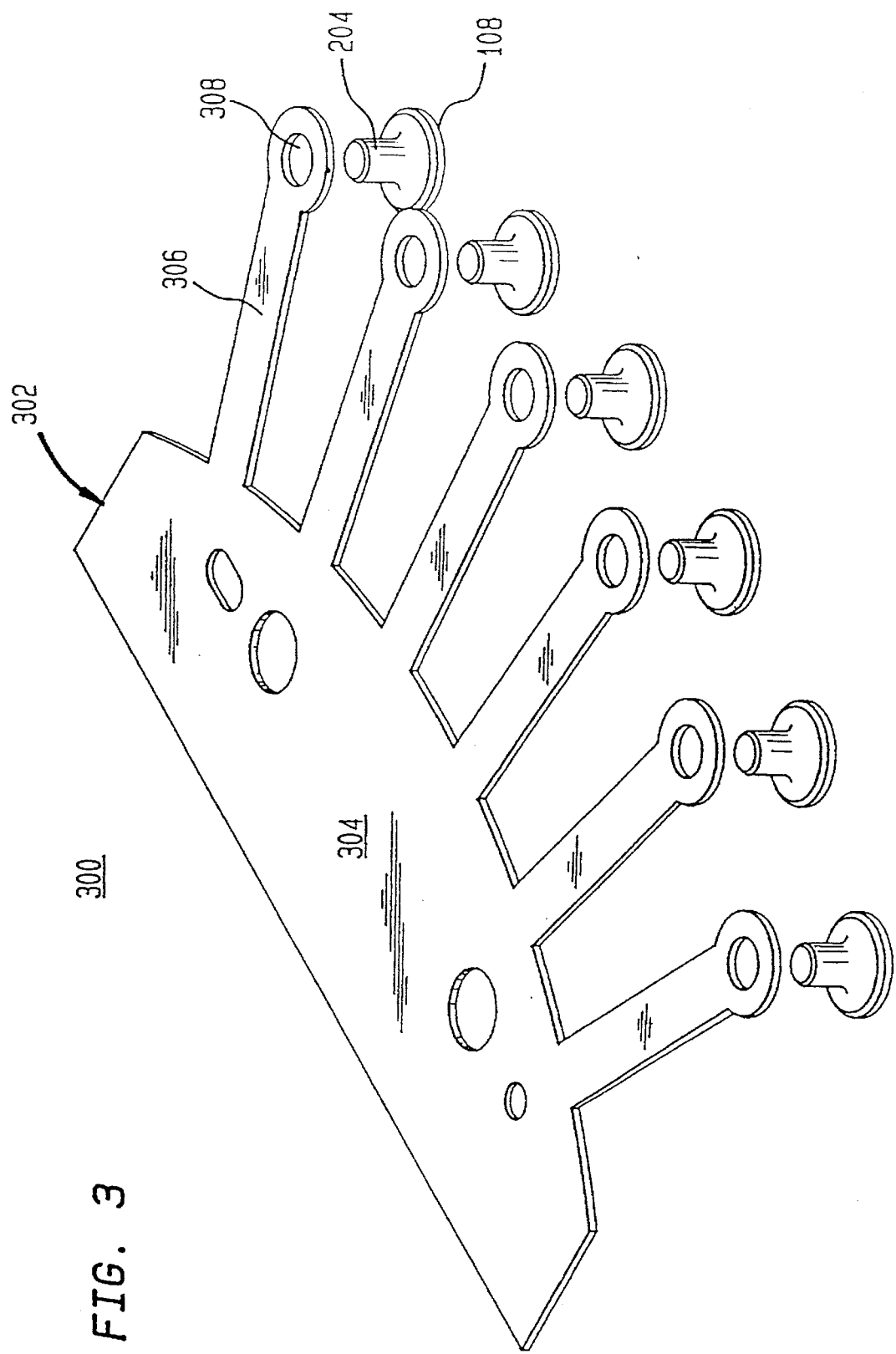
FIG. 3 is a perspective, exploded view of a compliant guide assembly.

FIG. 3 illustrates a compliant guide assembly 300. Compliant guide assembly 300 includes a spring assembly 302 and a plurality of guide buttons 108. Spring assembly 302 includes a body portion 304 and a plurality of cantilever spring elements 306. Each cantilever spring element 306 includes a distal end defining an opening 308. Each opening 308 is configured 16 mate with a stem 204 of each guide button 108. Opening 308 is large enough to allow stem 204 to pass freely through opening 308. Each guide button is secured in an opening 308 using, for example, an adhesive. The preferred adhesive is an ultraviolet curing adhesive such as LOCTITE 12248, available from Loctite Corporation, Newington, Connecticut.

Some conventional guide assemblies have used buttons which do not include a stem portion. In these assemblies, the button head is attached directly to the distal end of each cantilever spring element 306. In other conventional guide assemblies, guide buttons with relatively short stems have been used. The short stem facilitates attachment of the guide button to a cantilever spring element. As explained above, however, the resulting conventional compliant guide assemblies exert unpredictable forces on the edge of an associated tape.

The inventors have discovered that many of the variables resulting in unpredictable biasing forces may be eliminated by calibrating each cantilever spring element during button attachment. Calibration adjustment is made possible by the elongated stem 204 of each guide button 108 and the opening 308 in each cantilever spring element 306. The distal end of each cantilever spring element may be moved along stem 204 and attached at any point thereon. This adjustability allows for precise force calibration.

Figure 4:
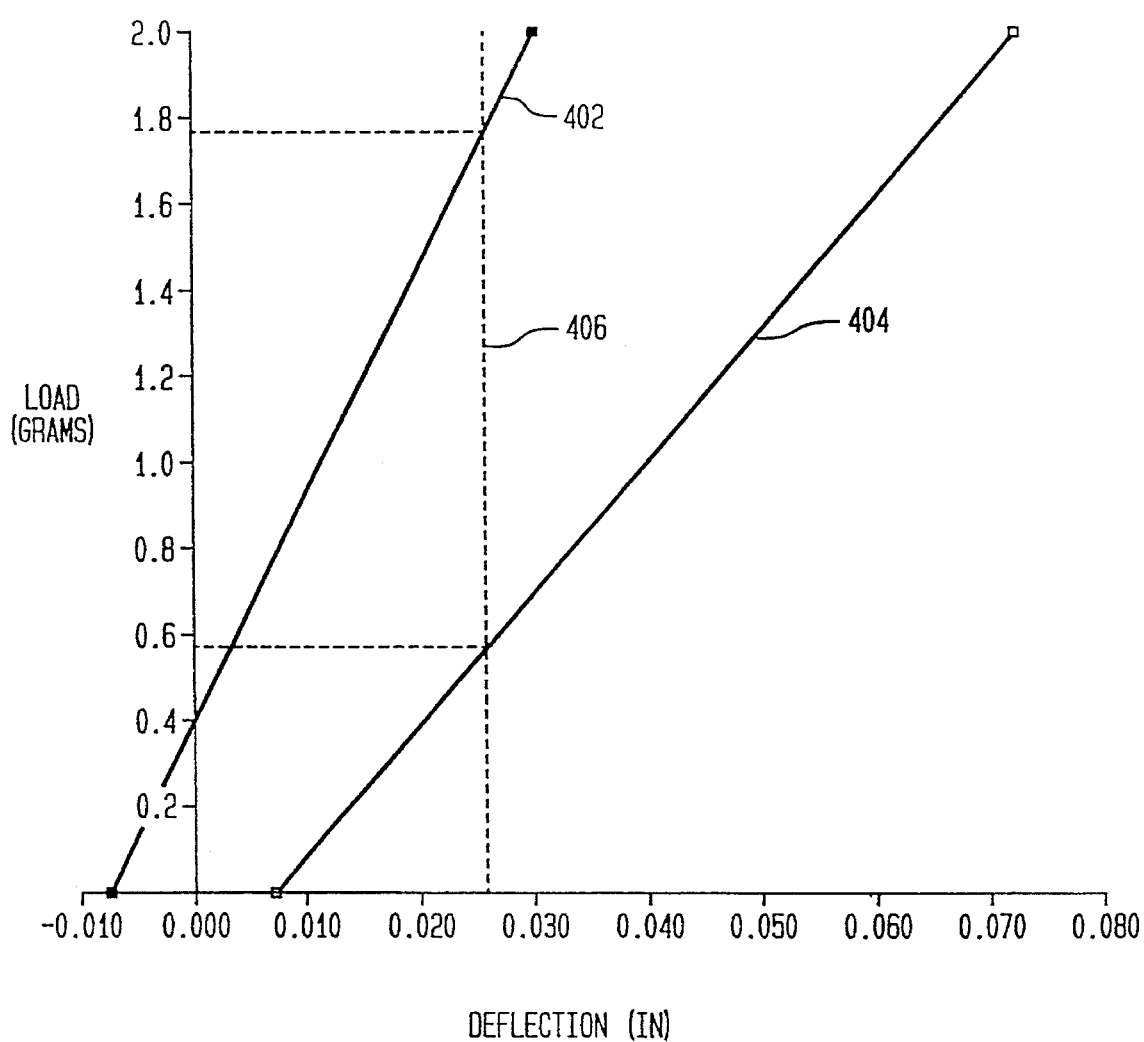
FIG. 4 is a graph illustrating maximum and minimum spring deflections as a function of load for a conventional compliant guide assembly.

FIG. 4 illustrates the unpredictability of a force applied to the edge of a tape by a conventional cantilever spring element with attached guide button. The graph represents spring deflection (X axis) as a function of the load (Y axis) applied to the button at the distal end of the spring. Each of plots 402 and 404 repent the relationship between deflection and load for a conventional cantilever spring element. Plot 402 has been computed using the maximum spring constant from manufacturing tolerances and the maximum negative offset. Plot 404 has been computed using the minimum spring constant from manufacturing tolerances and a maximum positive offset.

The maximum negative offset is the nominal deflection (in the direction of a tape edge) occurring in the spring element prior to application of a load on the spring. The maximum positive offset is the nominal deflection (in the direction away from a tape edge) occurring in the spring element prior to application of a load on the spring. These offsets occur as a result of curvatures of the spring material, variations in the thickness of the button, and variations in the thickness of the adhesive bond attaching the button to the distal end of the cantilever spring element.

In the preferred embodiment of the invention, the compliant guide assembly is designed to operate at a nominal 0.025 inch (0.6mm) deflection. This value is indicated on plot 400 by a vertical line 406. Note that plot 402 intersects line 406 at a load (force) of approximately 1.75 grams and that plot 404 intersects line 406 at a point equivalent to a load of approximately 0.55 grams. Thus, the conventional cantilever spring element may provide a force to the edge of a tape anywhere in this range. 1.75 grams represents a 218% increase over 0.55 grams. This variation is unacceptable for many applications.

Figure 5:
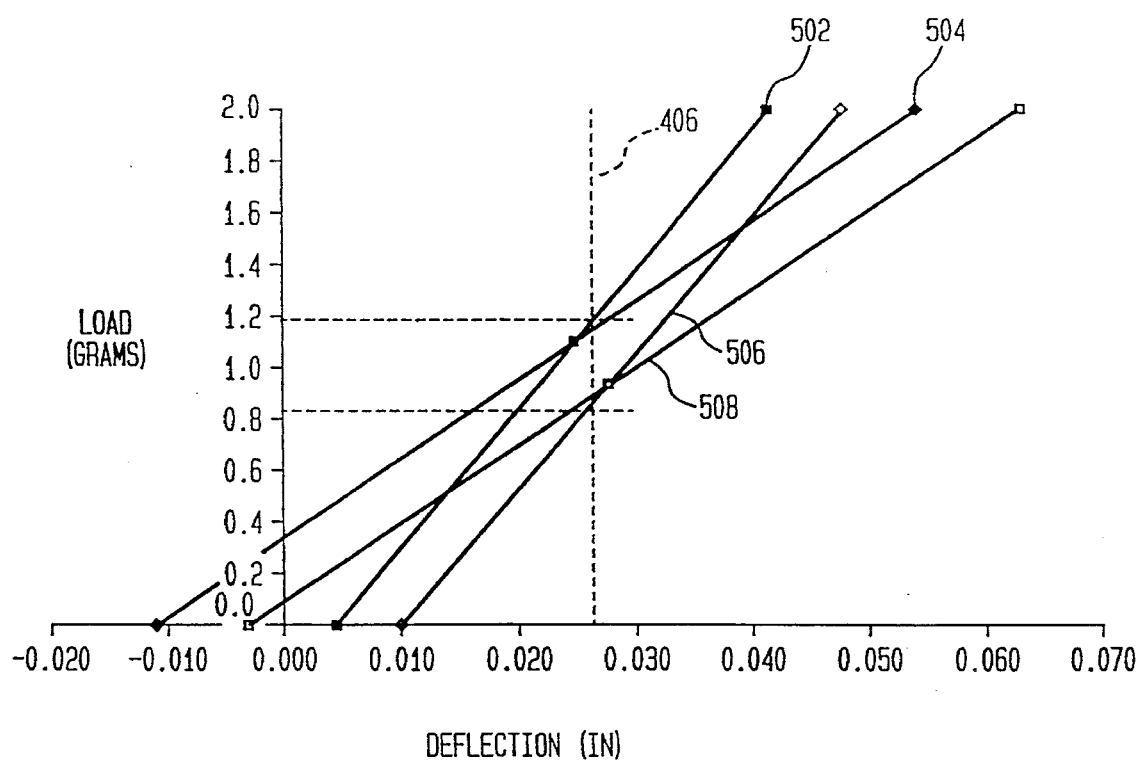
FIG. 5 is a graph illustrating maximum and minimum spring deflections as a function of load for the compliant guide assembly of the invention.

FIG. 5 illustrates deflection versus force plots for the compliant guide assembly of the invention. Plot 502 includes the maximum spring constant from manufacturing tolerances and the maximum positive fixture error. The positive fixture error represents the possible positive deflection in the button head due to tolerances in the calibration/assembly fixture 600 described below.

Plot 508 includes the minimum spring constant from manufacturing tolerances and the maximum positive fixture error. Plot 504 represents the minimum spring constant from manufacturing tolerances and the maximum negative fixture error. The negative fixture error represents the negative deflection caused by tolerances in the calibration/assembly fixture. Plot 506 includes the maximum spring constant from manufacturing tolerances and the maximum negative fixture error.

The nominal design deflection of 0.025 inches is indicated by line 406. Taking the worst case values of maximum spring constant and maximum positive fixture error (plot 502) and the maximum spring constant/maximum negative fixture error (plot 506) will yield a worst case load range of approximately 0.8 grams to 1.2 grams at the nominal deflection point. 1.2 grams represents a 50% increase in force over 0.8 grams. Thus, as compared with a conventional compliant guide assembly, the invention yields a 168% decrease in the variability of the edge biasing force.

It should be understood that the tolerance values used to represent a conventional compliant guide assembly in FIG. 4 are likely much tighter than those common in the industry. While manufacturing tolerances were used to determine maximum and minimum limits for the spring assembly and guide button materials, the tolerances represent the tightest tolerances which could be cost effectively manufactured.

Figure 6:
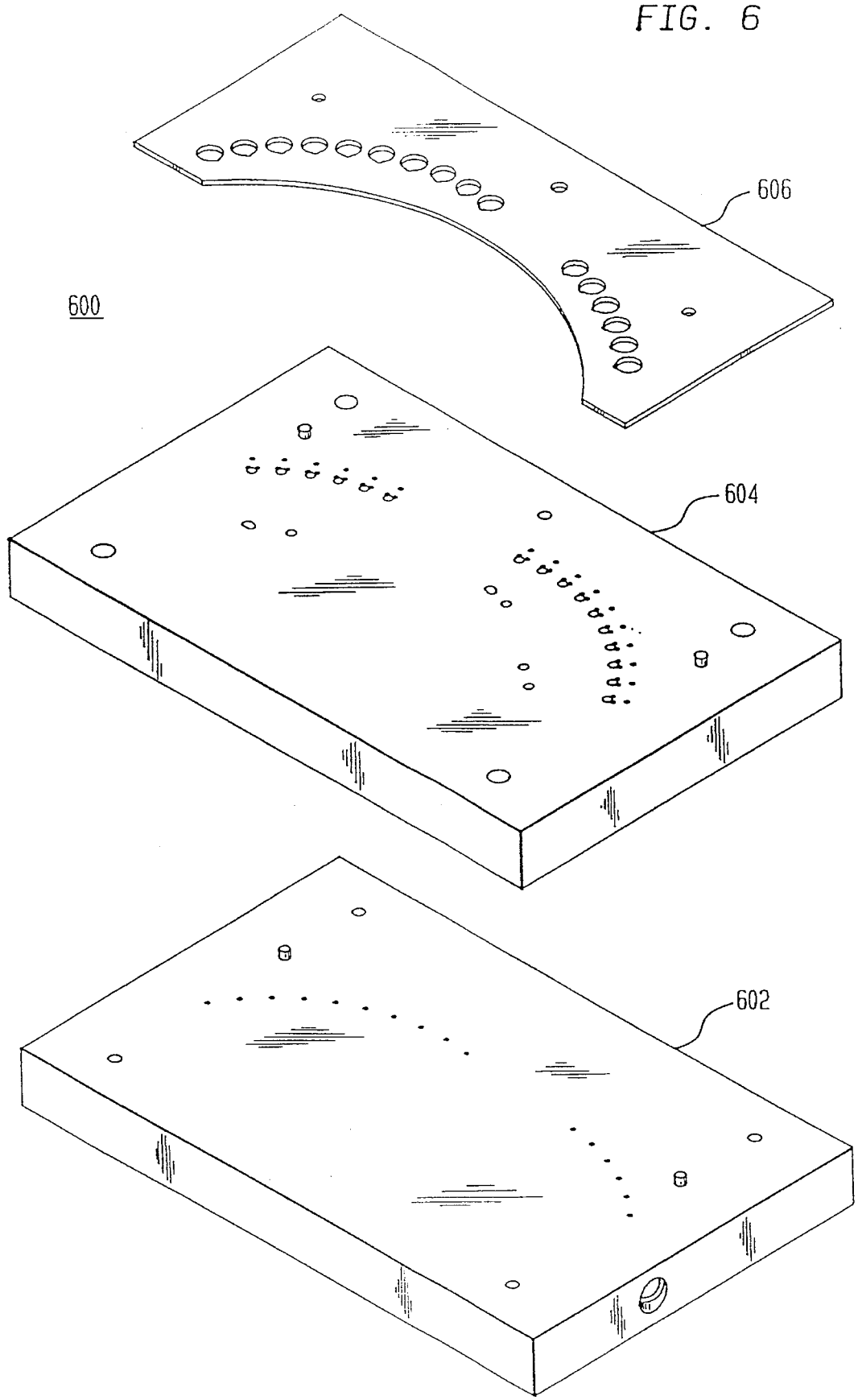
FIG. 6 is an exploded, perspective view of the compliant guide assembly fixture of the invention.

Assembly and calibration of the compliant guide assembly of the invention is performed in a single operation using a fixture 600 illustrated in FIG. 6. Fixture 600 includes a pressure plate 602, a vacuum block 604, and a button template 606. FIG. 6 shows fixture 600 in an exploded view. Fixture 600 is assembled substantially as arranged in the figure. Vacuum block 604 mounts to the upper surface of pressure plate 602. Button template 606 mounts to the upper surface of vacuum block 604.

Figure 7:
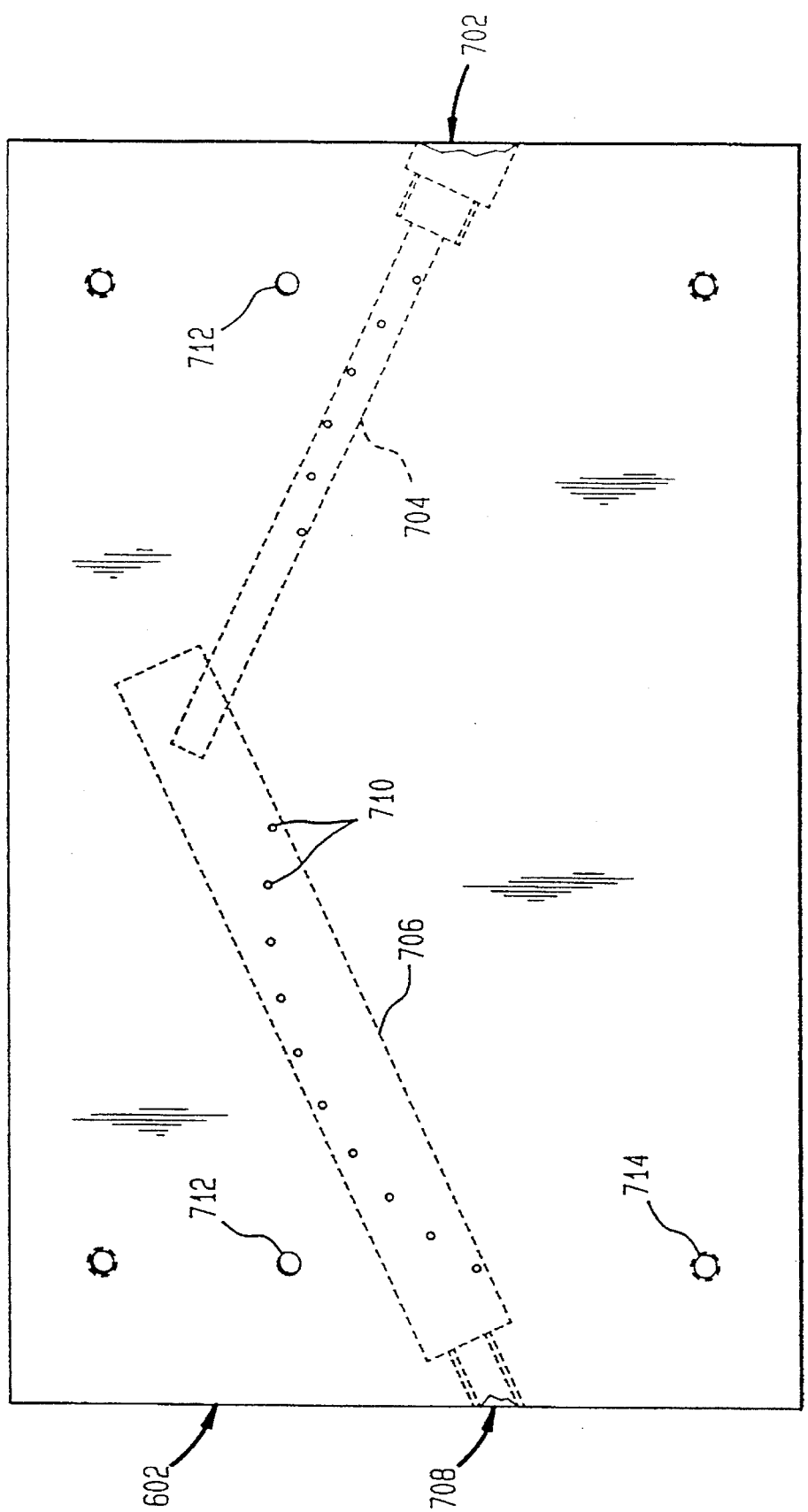
FIG. 7 is a top view of the pressure plate of the compliant guide assembly fixture of the invention.

Further structure and operation of fixture 600 is described with reference to FIGS. 7–14. FIG. 7 is a top view of pressure plate 602. Pressure plate 602 includes a pressure inlet 702, pressure passages 704 and 706, and a vent 708. A plurality of pressure ports 710 are disposed in the upper surface of pressure plate 602. Each pressure port 710 connects the upper surface of pressure plate 602 with pressure passages 704,706.

Pressure inlet 702 is configured to mate with a source of pressurized fluid (e.g., compressed air) and to provide the pressurized fluid to each pressure port 710. Vent 708 provides a small flow of pressurized fluid in pressurized channels 704,706 to assure a stable supply pressure. Vent 708 is optional and may be plugged subsequent to machining pressure channel 706.

Alignment pins 712 are provided to align pressure plate 602 with vacuum block 604 when a lower surface of vacuum block 604 is mated with the upper surface of pressure plate 602. A threaded hole 714 is provided near each corner of pressure plate 602. Threaded holes 714 are configured to accept a threaded fastener to secure vacuum block 604 to pressure plate 602.

Figure 8:
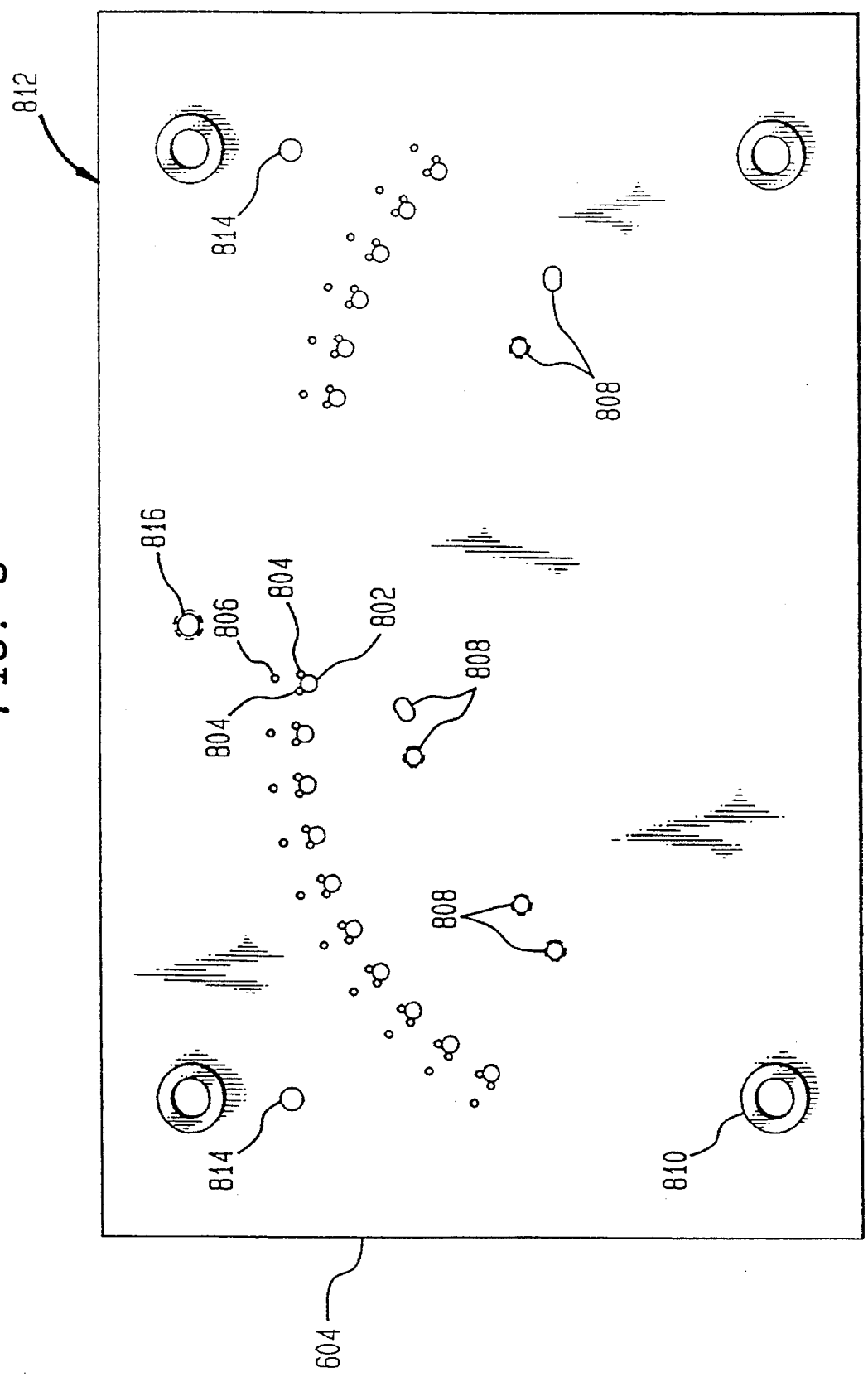
FIG. 8 is a top view of the vacuum block of the compliant guide assembly fixture of the invention.

FIG. 8 is a top view of vacuum block 604. Vacuum block 604 includes a plurality of pneumatic cylinders 802 which pass through vacuum block 604. Each cylinder 802 is positioned and configured to mate with a corresponding pressure port 710 of pressure plate 602 when vacuum block 604 is mated with pressure plate 602.

A pneumatic piston (described below) is positioned in each pneumatic cylinder 802. Each cylinder 802 has a diameter larger than the diameter of the corresponding pressure port 710. The smaller diameter of pressure ports 710 prevents the pneumatic pistons from entering pressure ports 710.

A vacuum port 806 and two button guide pins 804 are associated with each cylinder 802. Vacuum ports 806 are connected to a vacuum channel 902 (see FIG. 9). As described below, each vacuum port 806 is configured and arranged to provide a vacuum force to seat a button in the fixture prior to attachment of the button to a corresponding cantilever spring element.

As discussed below, button guide pins 804 are used for button alignment. Button guide pins 804 are required only if "D" shaped buttons are used.

Vacuum block 604 also includes threaded holes 808 which are provided for attachment of a compliant guide assembly to the upper surface of vacuum block 604. A through hole 810 is provided adjacent each corner of vacuum block 604. Each through hole 810 corresponds in position to one of holes 714 in pressure plate 602. A threaded fastener passed through a hole 810 may be threaded into threaded hole 714 to secure vacuum block 604 to pressure plate 602. Two alignment pins 814 and a threaded hole 816 are provided to attach button plate 806 to vacuum block 604.

Figure 9:
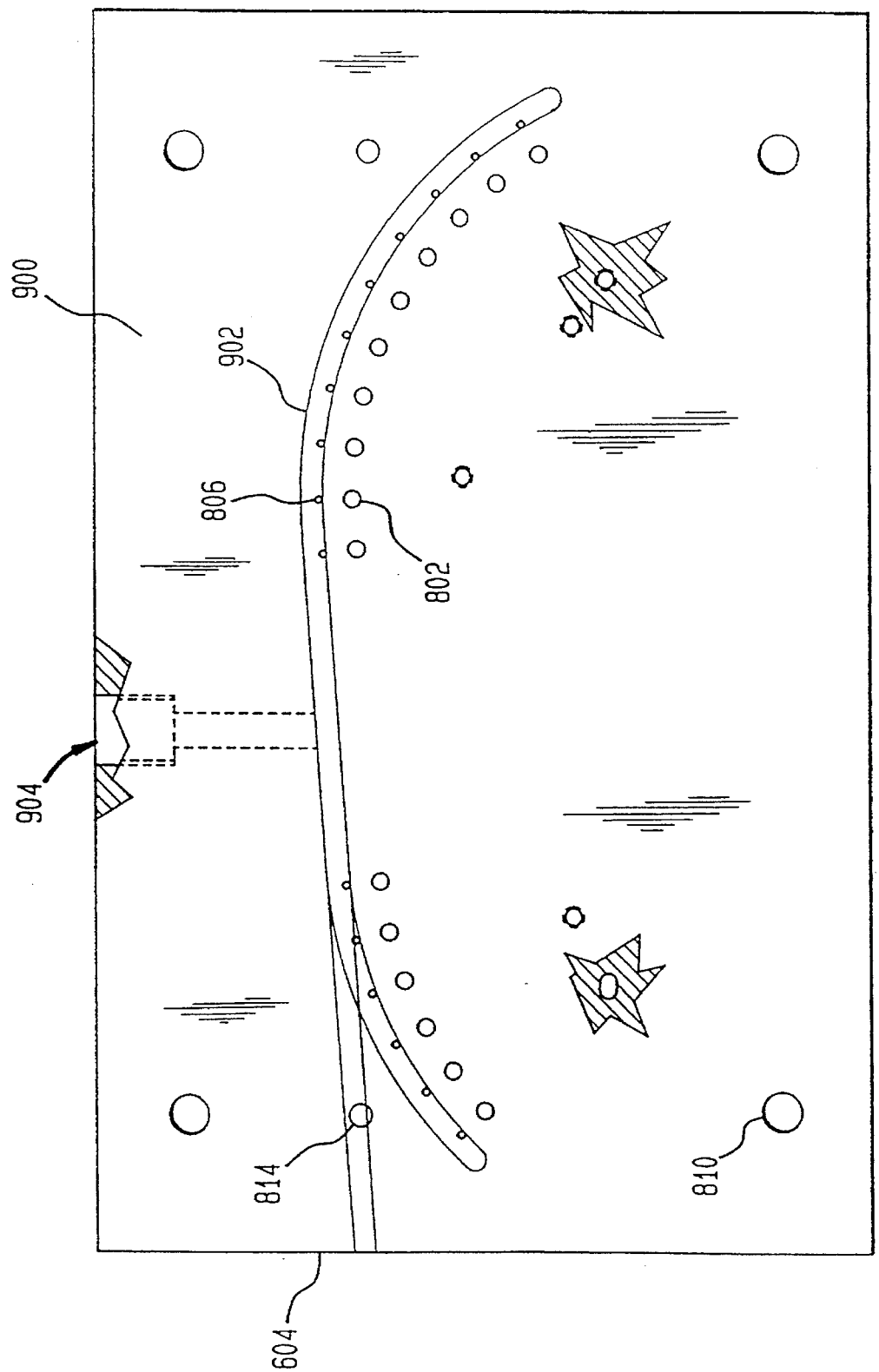
FIG. 9 is a bottom view of the vacuum block of the compliant guide assembly fixture of the invention.

FIG. 9 is a bottom view illustrating the bottom surface 900 of vacuum block 604. A vacuum channel 902 connects each of vacuum ports 806. A vacuum inlet 904 is provided to couple vacuum channel 902 with a vacuum source. Bottom surface 900 is configured to couple with the upper surface of pressure plate 602 such that vacuum channel 902 is substantially sealed at surface 900 to provide a vacuum path from vacuum inlet 904 to each vacuum port 806.

Figure 10:
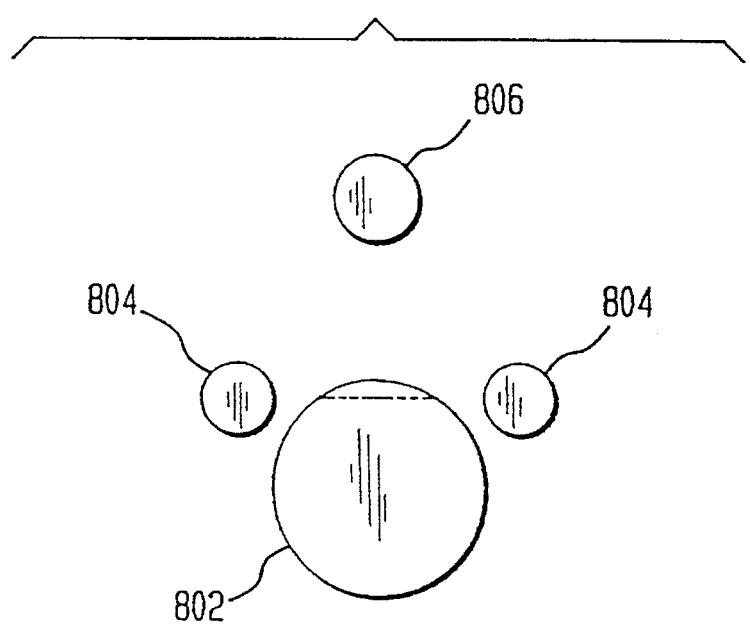
FIG. 10 illustrates the spatial relationship between a cylinder 802, guide pins 804 and a vacuum port 806 of the vacuum block.

FIG. 10 illustrates the spatial relationship between cylinder 802, vacuum port 806, and button guide pins 804.

Figure 11:
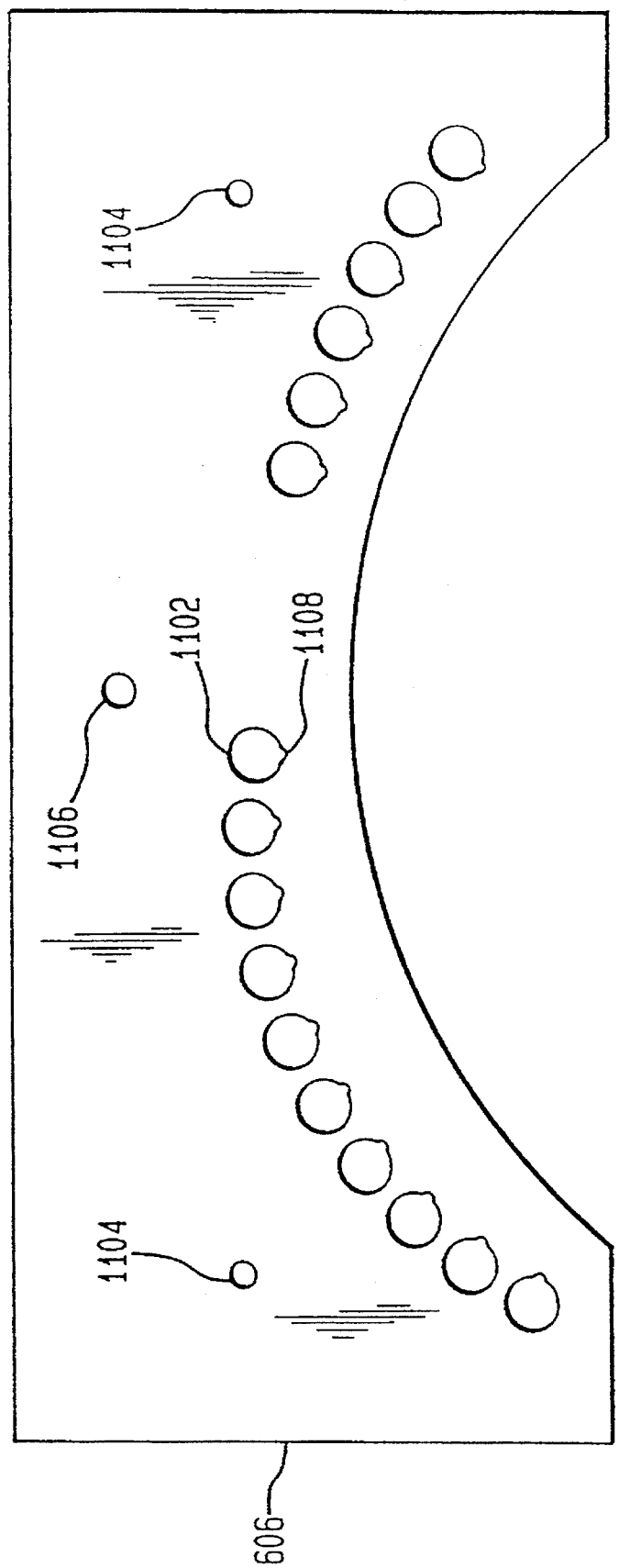
FIG. 11 is a top view of the button plate of the compliant guide assembly fixture of the invention.

FIG. 11 is a top view of button plate 606. Button plate 606 includes a plurality of button cavities 1102. Button plate 606 is configured to mount to the upper surface of vacuum block 604 via alignment pins 814 and threaded hole 816. Holes 1104 in button plate 606 mate with alignment pins 814 of vacuum block 604. Hole 1106 in button plate 606 aligns with threaded hole 816 of vacuum block 604. Hole 1106 is configured to allow passage of a threaded fastener therethrough.

Each button cavity 1102 is configured to accept placement of a guide button therein.

Figure 12:
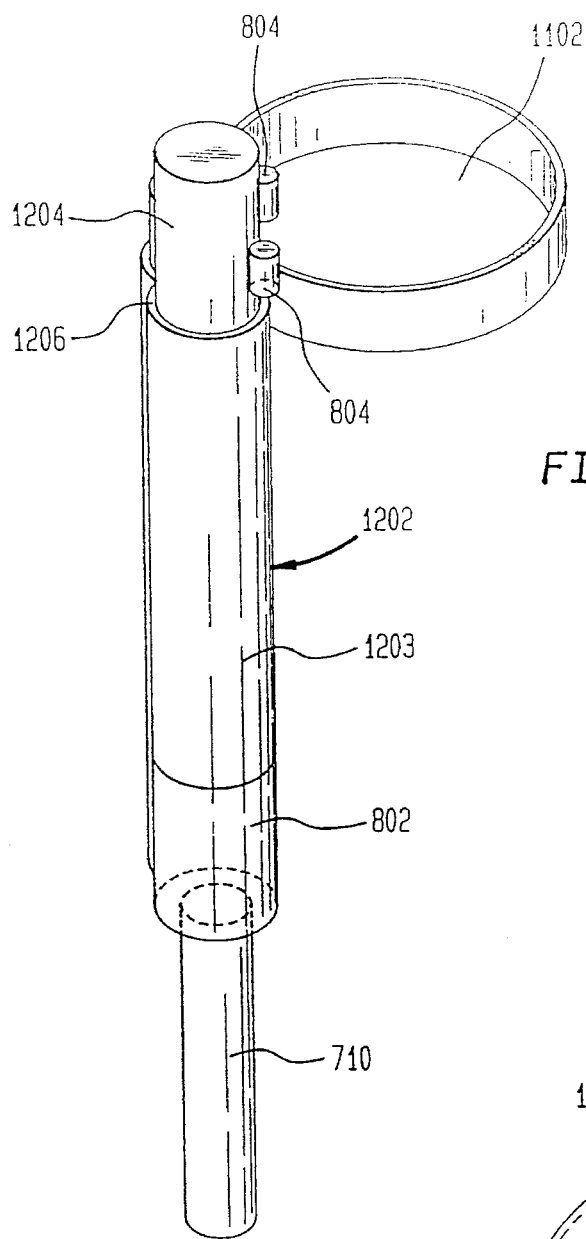
FIG. 12 is a perspective view illustrating the spatial relationship between a piston 1202, a cylinder 802 of the vacuum block, a pressure port 710 of the pressure plate, and a button cavity 1102 of the button plate when the fixture of the invention is fully assembled.

When calibration fixture 600 is fully assembled, a piston 1202 will be disposed in each cylinder 802 of vacuum block 604. This is illustrated in FIG. 12. FIG. 12 also illustrates alignment of each pressure port 710 with each cylinder 802. The introduction of a pressurized fluid into cylinder 802 via pressure port 710 will cause piston 1202 to move upward in cylinder 802.

Piston 1202 includes a lower portion 1203 and an upper potion 1204. A lip 1206 is formed between portions 1203 and 1204. This is illustrated further in FIG. 13.

Figure 13:
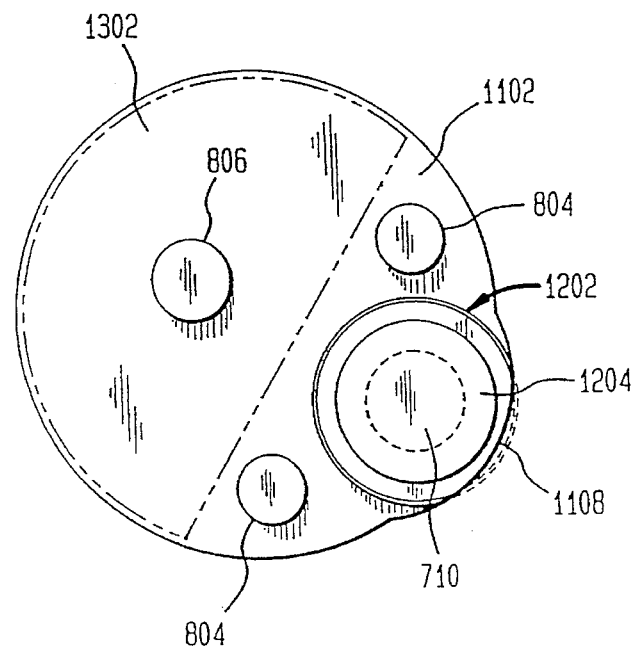
FIG. 13 is a top view illustrating the spatial relationship between a piston 1202, a pressure port 710 of the pressure plate, a vacuum port of the vacuum block, guide pins 804, a button cavity 1102 of the button plate and a guide button 1302.

FIG. 13 is a top view showing the relationship between button cavity 1102 and the components of vacuum block 604. A guide button 1302 is shown positioned in button cavity 1102. Note that in this particular embodiment, guide button 1302 has a "D" shape. Button guide pins 804 ensure that button 1302 is properly positioned within button cavity 1102. Button 1302 rests atop vacuum port 806. Note that a portion 1108 of button plate 606 extends closely adjacent to portion 1204 of piston 1202. When a pressurized fluid causes piston 1202 to move upward in cylinder 802, portion 1108 of button plate 606 will, by blocking lip portion 1206, limit the movement of piston 1202 in cylinder 802. This will prevent the pistons from "shooting" out of vacuum block 604 when pressure is applied to each cylinder 802.

Figure 14:
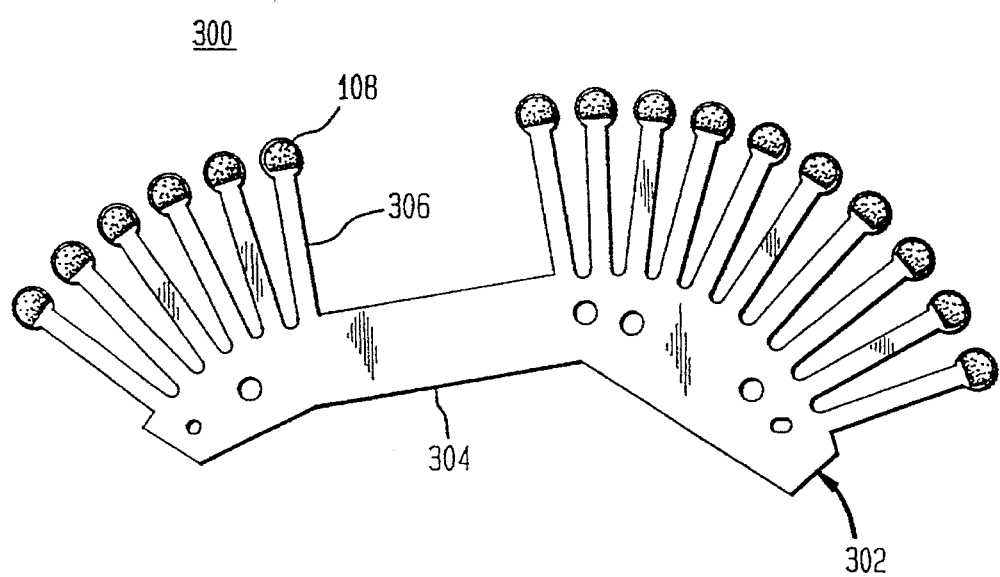
FIG. 14 shows a compliant guide assembly configured to be calibrated by the illustrated embodiment of the compliant guide assembly fixture of the invention.

The particular embodiment of fixture 600 described above is configured to calibrate a compliant guide assembly 300 as depicted in FIG. 14. Note the "D" shaped guide buttons 108. Also note the six holes in body 304 of spring assembly 302. These holes are configured to align with mounting holes 808 in vacuum block 604 for attachment of the spring assembly 302 to the fixture 600.

The method of manufacturing/calibrating the compliant guide assembly of the invention is now described. The method of the invention uses fixture 600 of the invention. In a first step, guide buttons 108 are loaded into button cavities 1102 of button plate 606. If "D" shaped buttons are used, then care should be taken to align the flat side of the button against button guide pins 804. If round buttons are used, then button guide pins 804 are not required and may be omitted from fixture 600. Once the buttons are positioned in the button cavities, a spring assembly 302 is then secured to vacuum block 604.

In the preferred embodiment, each button 108 is securely held in place in its corresponding button cavity 1102 by application of a vacuum force via vacuum ports 806. This assure, s that each button is properly seated and will be squarely attached to a spring element 306. Once the buttons are seated in this manner, a bias force is applied to each spring element 306 of spring assembly 302 via the individual pistons 1202 disposed in each cylinder 802 of vacuum block 604. A precise biasing force is exerted by each piston as a result of a pressurized fluid, preferably compressed air, being provided to each cylinder 802. Each piston contacts its corresponding spring element 306 adjacent button 108. The biasing force causes each cantilever spring element to be displaced upward from its corresponding button 108. Once the precise biasing forces have been applied, the stem of each guide button 108 is fixedly attached to the distal end of the cantilever spring element 306. Preferably, an ultraviolet curing adhesive material, such as LOCTITE 12248, is used to attach the stem of button 108 to spring element 306.

Once the attachment is complete (i.e., the adhesive has cured to a level sufficient to maintain the position of spring element 306 on the stem of guide button 108), the calibrated biasing force is released by releasing the pressure in each cylinder 802. The calibrated guide assembly may then be removed from the fixture.

Prior to using fixture 600 of the invention, it is preferred that the fixture be calibrated. Calibration involves adjusting the fluid pressure delivered to cylinders 802 until a selected, average force is applied by pistons 1204. The preferred method for performing this calibration is to place a reference weight (e.g., a one gram weight on each piston. The air pressure being delivered to the fixture is then adjusted to a pressure that will just lift the reference weights. Because the pistons are not individually adjustable, some will lift the reference weight before others. A median pressure is selected.

While the seating of buttons 108 in button cavities 1102 using a vacuum force is preferred, application of a vacuum force is not required. Other means for securing buttons 108 is cavities 1102 may be used. Such alternate means include gravity, clips, or a force supplied from above the button.

In the preferred embodiment, spring assembly 302 is photo etched from a sheet of stainless steel. Guide buttons 108 are formed from a ceramic material as is known in the art. The ceramic material provides excellent abrasion resistance for the surface which contacts the edge of the magnetic tape. Also in the preferred embodiment, pressure plate 602, vacuum block 604 and button plate 606 are machined from aluminum.

The inventors have found that calibrating a compliant guide assembly in accordance with the method of the invention will eliminate many of the variables which had resulted in unpredictable biasing forces from conventional compliant guide assemblies. The variables eliminated by the invention include thickness, curvature, width and length of the material forming the spring elements. Variations in the modulus of elasticity of the material, the thickness of the guide button, and the thickness of the epoxy bond line are also eliminated.

In the preferred embodiment of fixture 600, pistons 1202 are pneumatically (e.g., compressed air) actuated. A person skilled in the art will recognize that hydraulic actuation may also be used.

Although the invention has been described and illustrated with a certain degree of particularity, it is understood that one skilled in the relevant an will recognize a variety of additional applications and appropriate modifications within the spirit of the invention and scope of the claims.

What is claimed is:

1. A compliant guide assembly for providing an edge biasing force to a tape to precisely position the tape as it passes a read/write head in a tape transport, the guide assembly comprising:

a spring assembly formed from a sheet of resilient material, the spring assembly including a body portion and a plurality of cantilever spring elements, each cantilever spring element extending outward from said body portion; and a plurality of guide buttons, each guide button including an elongated stem and a head, said stem of each guide button being fixedly attached to a distal end of one of said cantilever spring elements in a manner in which the distance between said head of said guide button and the distal end of said cantilever spring element is varied during calibration to compensate for variables which contribute to the edge biasing force exerted by said cantilever spring element at said head of said guide button, said plurality of guide buttons providing a substantially equivalent edge biasing force to the tape.

2. The compliant guide assembly of claim 1, wherein said spring assembly is photo etched from a sheet of stainless steel.

3. The compliant guide assembly of claim 2, wherein said guide buttons are made from a ceramic material.

4. The compliant guide assembly of claim 3, wherein each of said guide buttons are fixedly attached to said distal end of one of said cantilever spring elements by means of an ultraviolet curing adhesive.

5. The compliant guide assembly of claim 4, wherein said cantilever spring elements operate at a nominal 0.025 inch deflection.

* * * * *

UNITED STATES PATENT AND TRADEMARK OFFICE
CERTIFICATE OF CORRECTION

PATENT NO. : 5,572,393
DATED : November 5, 1996
INVENTOR(S) : Church et al.

It is certified that error appears in the above-indentified patent and that said Letters Patent is hereby corrected as shown below:

Title page, item [75], delete "Willis A. Straight, Arvada".

Signed and Sealed this

Twenty-first Day of January, 1997

Attest:

BRUCE LEHMAN

*Attesting Officer*     *Commissioner of Patents and Trademarks*